US012435852B2

(12) United States Patent
Bai et al.

(10) Patent No.: US 12,435,852 B2
(45) Date of Patent: Oct. 7, 2025

(54) LIGHTING DEVICE AND MOTOR VEHICLE

(71) Applicant: VALEO VISION, Bobigny (FR)

(72) Inventors: Lu Bai, Hubei (CN); Xin Zeng, Hubei (CN); Ling Dai, Hubei (CN); Xingming He, Hubei (CN)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/694,475

(22) PCT Filed: Sep. 20, 2022

(86) PCT No.: PCT/EP2022/076106
§ 371 (c)(1),
(2) Date: Mar. 22, 2024

(87) PCT Pub. No.: WO2023/046686
PCT Pub. Date: Mar. 30, 2023

(65) Prior Publication Data

US 2025/0129910 A1 Apr. 24, 2025

(30) Foreign Application Priority Data

Sep. 23, 2021 (CN) ........................ 202122301806.2

(51) Int. Cl.
*F21S 41/47* (2018.01)
*F21S 41/147* (2018.01)
(Continued)

(52) U.S. Cl.
CPC ............. *F21S 41/47* (2018.01); *F21S 41/147* (2018.01); *F21S 41/19* (2018.01); *F21S 41/321* (2018.01);
(Continued)

(58) Field of Classification Search
CPC .......... F21S 41/147; F21S 41/19; F21S 43/14; F21S 43/19; F21S 41/321; F21S 43/401; F21S 41/47
See application file for complete search history.

(56) References Cited

U.S. PATENT DOCUMENTS 6,958,498 B2 * 10/2005 Shelton ................ H10H 20/831 257/79
7,762,700 B2 7/2010 Luo et al.
(Continued)

FOREIGN PATENT DOCUMENTS

CN 103822148 A 5/2014
CN 104100902 A 10/2014
(Continued)

OTHER PUBLICATIONS

Search English translation of JP-3993088-B2 (Year: 2007).*
(Continued)

*Primary Examiner* — Omar Rojas Cadima
(74) *Attorney, Agent, or Firm* — Valeo Vision

(57) ABSTRACT

The present invention provides a lighting device including a light source, a printed circuit board, an optical face and a lens, with the light source being mounted on the printed circuit board, and at least a portion of light rays emitted by the light source towards the optical face are guided by the optical face and then emerge through the lens. At least one light shielding electronic element is also mounted on the printed circuit board, for blocking at least a portion of light rays emitted by the light source towards the lens, to prevent this portion of light rays from emerging through the lens directly.

9 Claims, 2 Drawing Sheets

(51) Int. Cl.

| | |
|---|---|
| ***F21S 41/19*** | (2018.01) |
| ***F21S 41/32*** | (2018.01) |
| ***F21S 43/14*** | (2018.01) |
| ***F21S 43/19*** | (2018.01) |
| ***F21S 43/31*** | (2018.01) |
| ***F21S 43/40*** | (2018.01) |

(52) U.S. Cl.
CPC ............... *F21S 43/14* (2018.01); *F21S 43/19* (2018.01); *F21S 43/31* (2018.01); *F21S 43/401* (2024.05)

(56) References Cited

U.S. PATENT DOCUMENTS

| | | | | |
|---|---|---|---|---|
| 8,142,060 | B2 | 3/2012 | Saida et al. | |
| 9,546,766 | B2 | 1/2017 | Brendle et al. | |
| 9,599,304 | B2 | 3/2017 | Brendle et al. | |
| 10,533,722 | B2 | 1/2020 | Albou et al. | |
| 10,578,267 | B2 | 3/2020 | Bowles et al. | |
| 11,022,266 | B2 | 6/2021 | Hermitte et al. | |
| 2012/0140505 | A1* | 6/2012 | Tsukamoto ........... | F21S 41/192 362/520 |
| 2014/0133169 | A1 | 5/2014 | Schwaiger et al. | |
| 2018/0112844 | A1* | 4/2018 | Bowles ................... | F21S 45/49 |

FOREIGN PATENT DOCUMENTS

| | | | | |
|---|---|---|---|---|
| CN | 104121533 | A | 10/2014 | |
| CN | 205991402 | U | 3/2017 | |
| DE | 102009022723 | A1 | 12/2009 | |
| DE | 102012220455 | A1 | 5/2014 | |
| EP | 2487408 | A2 | 8/2012 | |
| EP | 3376096 | A1 | 9/2018 | |
| EP | 3708904 | A1 | 9/2020 | |
| JP | 3993088 | B2 * | 10/2007 | |
| JP | 4138586 | B2 * | 8/2008 | ............... F21K 9/00 |
| WO | 2006082559 | A1 | 8/2006 | |

OTHER PUBLICATIONS

Search English translation of JP 4138586 B2 (Year: 2008).*

European Patent Office, International Search Report and Written Opinion of corresponding International Application No. PCT/EP2022/076106, dated Dec. 13, 2022.

China Patent Office, Search Report of corresponding Chinese Patent Application No. 202122301806.2, dated Apr. 24, 2022.

* cited by examiner

LIGHTING DEVICE AND MOTOR VEHICLE

TECHNICAL FIELD

The present invention relates to the technical field of vehicle lamps, in particular to a lighting device and a motor vehicle.

BACKGROUND OF THE INVENTION

Lighting devices can provide light for illumination and/or signaling, and are widely used in various fields; for example, vehicle lamps are used in motor vehicles to ensure safe travel. Types of vehicle lamp may include motor vehicle headlamps (including low beam lamps and high beam lamps), fog lamps, tail lamps, daytime running lamps, turn signal lamps, brake lamps and side marker lamps, etc., and in the field of vehicle lamp lighting, various countries have strict legal requirements regarding light distribution.

In some vehicle lamp modules, a reflector, a light source and a lens cooperate to achieve the required light distribution. However, due to a lack of control over light rays emitted by the light source, some stray light rays might not be reflected by the reflector, and emerge through the lens directly; this results in a light distribution that does not meet the legal requirements, and will also cause glare.

To solve this problem, a light shielding part is generally formed integrally on a heat sink, in order to block stray light rays of the light source. In this case, the light source is quite far from the light shield, so the blocking effect is not ideal; moreover, the light source needs to be located as close as possible to an edge part of the printed circuit board in order to be close to the light shield, so heat dissipation performance is also quite poor.

SUMMARY OF THE INVENTION

Thus, an object of the present invention is to propose a lighting device and a motor vehicle, which can at least partially solve the problems mentioned above.

According to one aspect of the present invention, a lighting device is provided, comprising a light source, a printed circuit board, an optical face and a lens, wherein

- the light source is mounted on the printed circuit board, and at least a portion of light rays emitted by the light source towards the optical face are guided by the optical face and then emerge through the lens;
- at least one light shielding electronic element is also mounted on the printed circuit board, for blocking at least a portion of light rays emitted by the light source towards the lens, to prevent this portion of light rays from emerging through the lens directly.

Compared with the solution in the prior art in which a light shielding part is integrated in the heat sink, using an electronic element on the printed circuit board as a light shielding part in the embodiments of the present invention can improve the heat dissipation performance of the light source and the blocking precision, reduce the weight of the heat sink, and lower the production cost.

In some embodiments, a single light shielding electronic element is mounted on the printed circuit board, the light shielding electronic element having a larger size than the light source.

According to the embodiments of the present invention, when a single light shielding electronic element is used, configuring the light shielding electronic element to have a larger size than the light source enables effective blocking of light rays emitted by the light source towards the lens.

In some embodiments, multiple light shielding electronic elements are mounted on the printed circuit board, the multiple light shielding electronic elements being arranged together to block at least a portion of light rays emitted by the light source towards the lens.

According to the embodiments of the present invention, when multiple light shielding electronic elements are used, the light shielding electronic elements are suitably arranged to enable effective blocking of light rays emitted by the light source towards the lens.

In some embodiments, the minimum distance between the light source and an edge of the printed circuit board is greater than 4 mm.

According to the embodiments of the present invention, using the light shielding electronic element on the printed circuit board as a light shielding part allows the light source to be arranged at a position further from the edge, so the heat dissipation performance of the light source can be improved.

In some embodiments, the light shielding electronic element is not included in an electronic circuit.

According to the embodiments of the present invention, a suitable electronic element may be chosen flexibly according to requirements to block light rays emitted by the light source towards the lens; there is no need to be restricted to an electronic element included in the electronic circuit.

In some embodiments, the light shielding electronic element is arranged so as not to block light rays from the optical face.

According to the embodiments of the present invention, this can prevent the light shielding electronic element from having an adverse effect on normal light distribution.

In some embodiments, the light source comprises a light emitting diode.

In some embodiments, the optical face comprises a reflecting surface of a reflector.

According to another aspect of the present invention, a motor vehicle is further provided, comprising any one of the lighting devices described above.

BRIEF DESCRIPTION OF THE DRAWINGS

To facilitate understanding of the present invention, the present invention is described in greater detail below, based on exemplary embodiments and referring to the drawings. In the drawings, identical or similar reference labels are used to denote identical or similar members. It should be understood that the drawings are merely schematic, and the dimensions and proportions of the members in the drawings are not necessarily precise.

DETAILED DESCRIPTION OF THE INVENTION

Figure 1:
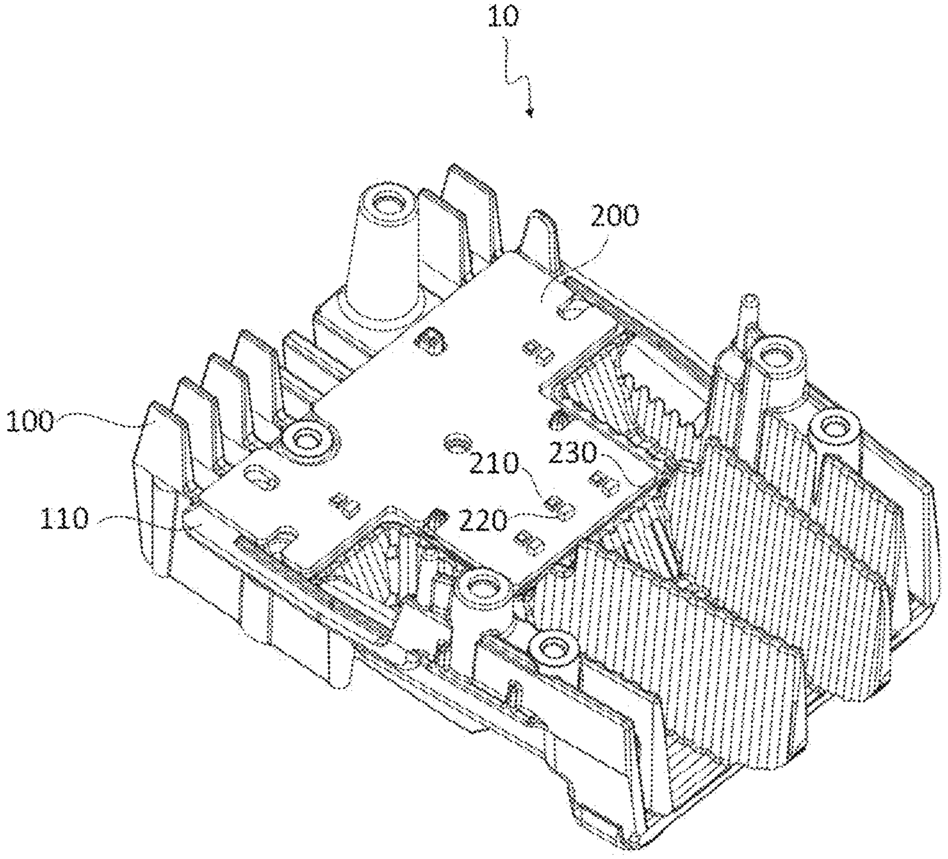
FIG. 1 shows a perspective view of a lighting device according to an embodiment of the present invention.

Embodiments of the present invention are described demonstratively below. As those skilled in the art should realize, the embodiments explained may be amended in various ways without departing from the concept of the present invention. Thus, the drawings and description are essentially illustrative, not restrictive. In the following text, identical reference numerals generally denote elements with identical or similar functions.

The present invention is described in detail below with reference to the drawings.

Figure 2:
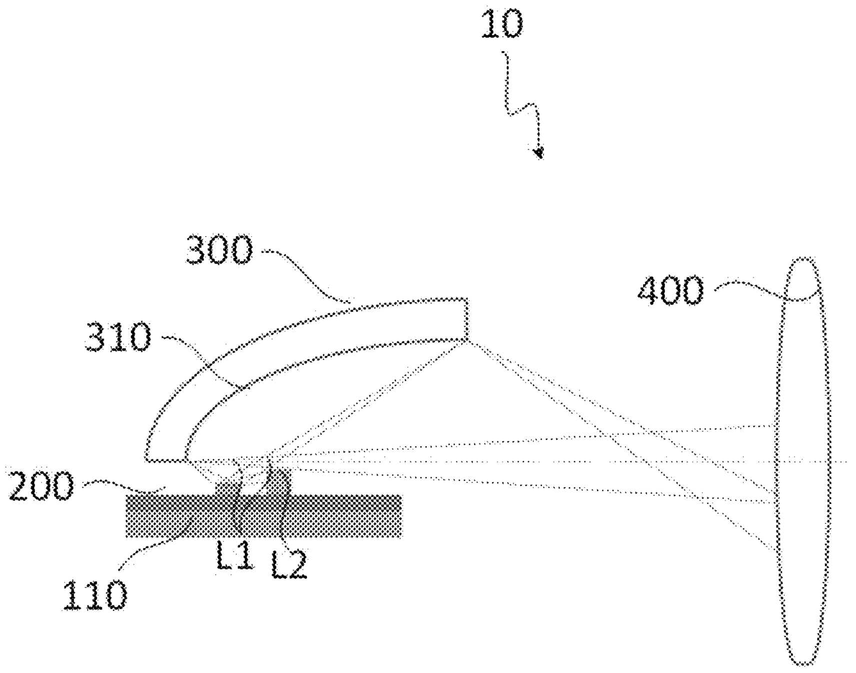
FIG. 2 shows a schematic light path diagram of a lighting device according to an embodiment of the present invention.

FIG. 1 shows a perspective view of a lighting device 10 according to an embodiment of the present invention; FIG. 2 shows a schematic light path diagram of a lighting device 10 according to an embodiment of the present invention. As shown in FIGS. 1 and 2, the lighting device 10 comprises a heat sink 100, a printed circuit board 200, a reflector 300 and a lens 400. The heat sink 100 comprises a mounting surface 110, which is substantially planar in order to carry the printed circuit board 200; the printed circuit board 200 may be fixed to the mounting surface 110 by positioning pins, positioning holes, screw connection, etc.

The printed circuit board 200 comprises a light source 210 and a light shielding electronic element 220 located close to the light source 210. As shown in FIG. 2, at least a portion of light rays L1 emitted by the light source 210 towards the reflector 300 are reflected by an optical face (i.e. a reflecting surface 310) of the reflector 300 and then emerge through the lens 400; at least a portion of light rays L2 emitted by the light source 210 towards the lens 400 are blocked by the light shielding electronic element 220, and so cannot emerge through the lens 400, thus avoiding an undesired light distribution. Furthermore, as shown in FIG. 2, multiple light sources may be mounted on the printed circuit board 200, with each light source having a corresponding light shielding electronic element.

In one example, the light shielding electronic element 220 has a larger size than the light source 210, in order to effectively block light rays emitted by the light source 210 towards the lens 400. For example, the light shielding electronic element 220 has a greater height than the light source 210, or the light shielding electronic element 220 has a greater width than the light source 210 (in FIG. 1, this is the dimension that is substantially in the direction parallel to an edge 230 of the printed circuit board 200), or both the height and width of the light shielding electronic element 220 are greater than the height and width of the light source 210.

In one example, the light shielding electronic element 220 is located between the light source 210 and the edge 230 of the printed circuit board 200, and the distance between the light source 210 and the edge 230 may be greater than 4 mm. In the prior art solution in which a light shielding part is integrated in the heat sink, the light source needs to be as close as possible to an edge of the printed circuit board, so the heat dissipation performance of the light source is poor. However, in the embodiments of the present invention, using the light shielding electronic element on the printed circuit board 200 as a light shielding part allows the light source 210 to be arranged at a position further from the edge 230, so the heat dissipation performance of the light source 210 can be improved.

In one example, the light shielding electronic element 220 is not energized to perform a circuit function, i.e. is not included in an electronic circuit. Thus, a suitable electronic element may be chosen flexibly according to requirements to block light rays emitted by the light source towards the lens; there is no need to be restricted to an electronic element included in the electronic circuit.

In one example, the dimensions of the light shielding electronic element 220 and its distance from the light source 210 are such that it will not block light rays from the optical face. This can prevent the light shielding electronic element 220 from having an adverse effect on normal light distribution.

In one example, the light source 210 comprises a light emitting diode, but may also comprise any other suitable type of light source.

It must be explained that in the embodiments of the present invention, no limitations are placed on the type of the light shielding electronic element 220; it may be a capacitor, resistor, inductor, diode, transistor or IC, etc. as long as the dimensions thereof meet the light shielding requirements.

Both the light source 210 and the light shielding electronic element 220 may be fitted to the printed circuit board by processes such as through-hole mounting (DIP) and surface mounting (SMT), so the light shielding electronic element 220 may be mounted close to the light source 210 quite precisely, thus increasing the blocking precision.

In the example shown in FIG. 2, a single light shielding electronic element 220 is shown as blocking light rays emitted by the light source 210 towards the lens 400, but it will be understood that multiple light shielding electronic elements 220 could also be suitably arranged to block light rays emitted by the light source 210 towards the lens 400, for example if the light source 210 has a larger size than a single light shielding electronic element 220.

In the example shown in FIG. 2, the optical face for guiding light rays emitted by the light source 210 is shown as being the reflecting surface 310 of the reflector 300, but the embodiments of the present invention are not limited to this; the lighting device 10 may comprise other types of optical face to guide light rays emitted by the light source 210, and the guiding includes but is not limited to guiding by light reflection, refraction, scattering and transmission, etc.

Compared with the solution in the prior art in which a light shielding part is integrated in the heat sink, using an electronic element on the printed circuit board as a light shielding part in the embodiments of the present invention can improve the heat dissipation performance of the light source and the blocking precision, reduce the weight of the heat sink, and lower the production cost.

The embodiments of the present invention further relate to a motor vehicle, comprising any one of the lighting devices described above.

Although the technical objective, technical solution and technical effects of the present invention have been explained in detail above with reference to particular embodiments, it should be understood that the above embodiments are merely exemplary, not restrictive. Any amendments, equivalent substitutions or improvements made by those skilled in the art within the essential spirit and principles of the present invention shall be included in the scope of protection thereof.

What is claimed is:

1. A lighting device, comprising a light source, a printed circuit board, an optical face and a lens, with the light source being mounted on the printed circuit board, and at least a portion of light rays emitted by the light source towards the optical face are guided by the optical face and then emerge through the lens; and at least one light shielding electronic element is also directly mounted on the printed circuit board, for blocking at least a portion of light rays emitted by the light source towards the lens, to prevent this portion of light rays from emerging through the lens directly, with the at least one light shielding electronic element being fitted to the printed circuit board by a through-hole mounting process or a surface mounting process.

2. The lighting device according to claim 1, wherein a single light shielding electronic element is mounted on the printed circuit board, the light shielding electronic element having a larger size than the light source.

3. The lighting device according to claim 1, wherein multiple light shielding electronic elements are mounted on the printed circuit board, the multiple light shielding electronic elements being arranged together to block at least a portion of light rays emitted by the light source towards the lens.

4. The lighting device according to claim 1, wherein the minimum distance between the light source and an edge of the printed circuit board is greater than 4 mm.

5. The lighting device according to claim 1, wherein the light shielding electronic element is not included in an electronic circuit.

6. The lighting device according to claim 1, wherein the light shielding electronic element is arranged so as not to block light rays from the optical face.

7. The lighting device according to claim 1, wherein the light source includes a light emitting diode.

8. The lighting device according to claim 1, wherein the optical face includes a reflecting surface of a reflector.

9. A motor vehicle, comprising a lighting device including a light source, a printed circuit board, an optical face and a lens, with the light source being mounted on the printed circuit board, and at least a portion of light rays emitted by the light source towards the optical face are guided by the optical face and then emerge through the lens, and at least one light shielding electronic element is also directly mounted on the printed circuit board, for blocking at least a portion of light rays emitted by the light source towards the lens, to prevent this portion of light rays from emerging through the lens directly, with the at least one light shielding electronic element being fitted to the printed circuit board by a through-hole mounting process or a surface mounting process.

* * * * *